Sept. 12, 1967 P. J. BILY 3,340,907
FLUID TRANSFERRING ARM

Filed Jan. 20, 1964 3 Sheets-Sheet 1

FIG_1

INVENTOR
PETER J. BILY
BY *Hans G. Hoffmeister*
ATTORNEY

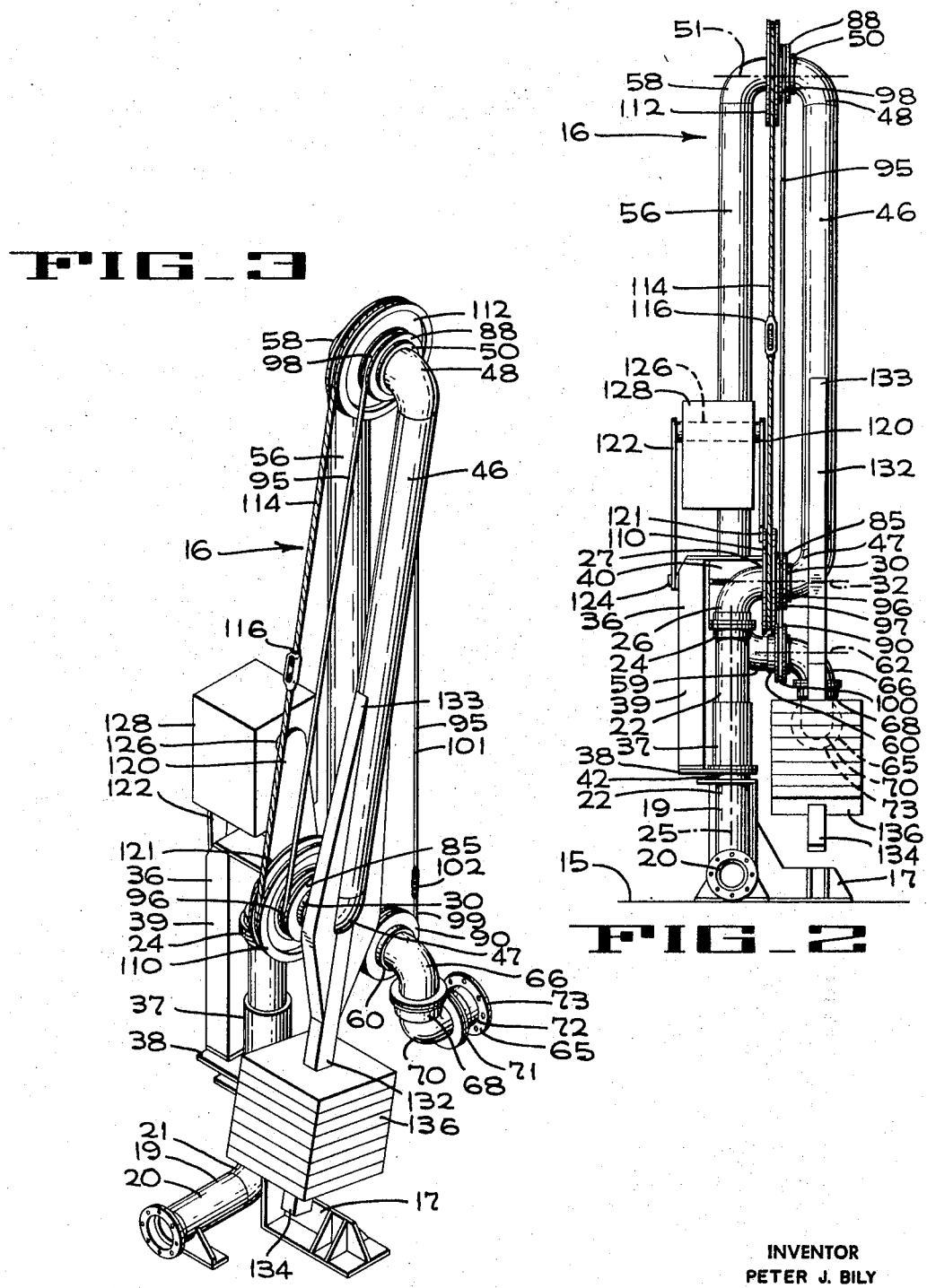

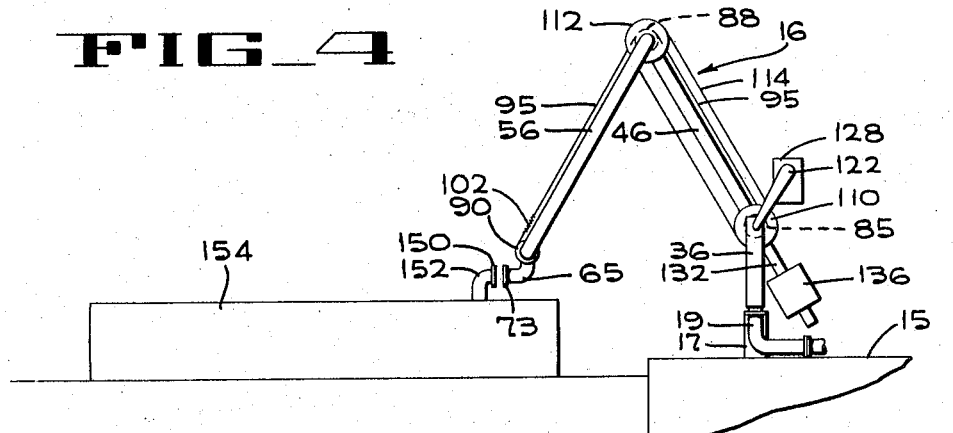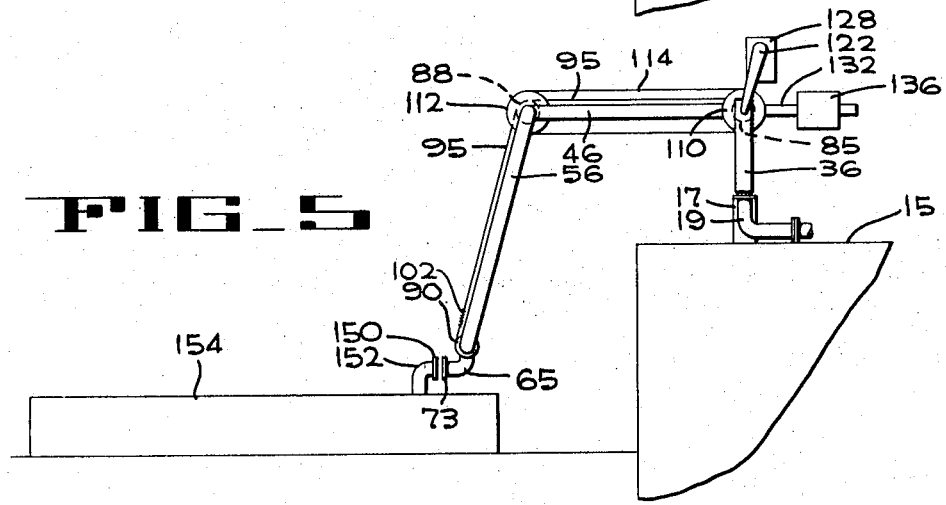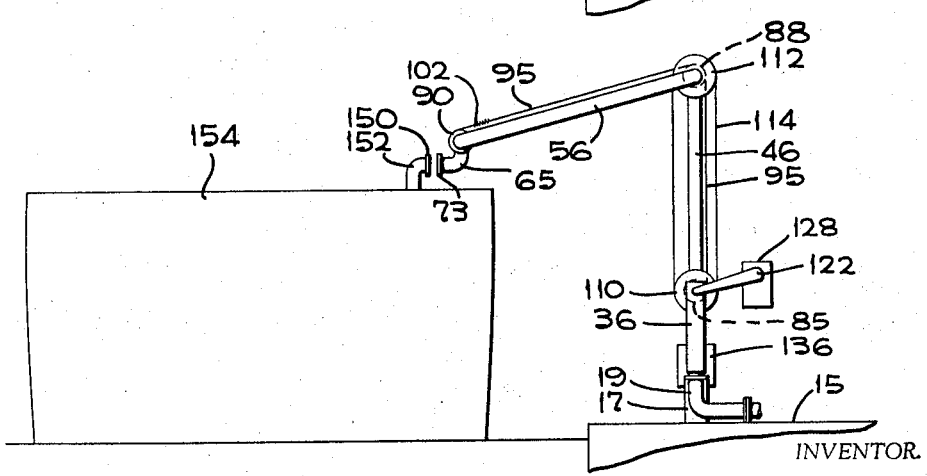

United States Patent Office
3,340,907
Patented Sept. 12, 1967

3,340,907
FLUID TRANSFERRING ARM
Peter J. Bily, Sunset Beach, Calif., assignor to FMC Corporation, San Jose, Calif., a corporation of Delaware
Filed Jan. 20, 1964, Ser. No. 338,682
7 Claims. (Cl. 141—387)

The present invention pertains to a fluid transferring arm including a coupling and a counterweight and more particularly to an apparatus which controls the attitude of the coupling and to an apparatus which mounts the counterweight in a noninterfering position relative to the coupling control apparatus and to other parts of the arm.

The controlling apparatus of the present invention is particularly suited for use in an articulated fluid transferring arm which conveys fluid to and from a ship docked at a pier, a tank truck, or the like. As is known, such an arm has an inner boom pivoted (on a pier for example) for elevational movement about a horizontal axis, an outer boom pivoted on the inner boom for elevational movement with respect thereto, a coupling on the outer boom for releasable connection to the manifold (on a ship for example), and mechanism for controlling the elevational movements of the booms. Of course, provision is made for conducting fluid lengthwise of the arm between a pipe on the pier and the manifold, either through bores or axial passageways in the booms and coupling or by flexible hoses carried by the booms and connected to the coupling.

The coupling has a flange which must mate and be fastened in fluid-tight relation with a flange on the ship's manifold. To enable attachment of the coupling flange to the manifold flange and to accommodate relative movement between the ship and the pier once connection is established, it is necessary that the coupling be pivotally attached to the outer boom. With the coupling freely pivotally suspended from the outer boom, the coupling flange normally assumes a downwardly inclined attitude, that is, the plane of the flange is in acute angular relation with a vertical plane.

It is well known that the flange of the manifold of a ship is usually located in a vertical plane disposed lengthwise of the ship. In connecting the fluid transferring arm to the manifold, an operator on the pier controllably maneuvers the arm so that the coupling is in a position adjacent to the manifold flange. Prior to the present invention, one or more of the crew on the ship then lift the coupling so as to mate its flange with the manifold flange and thereafter effect their interconnection.

The described manhandling procedure is generally satisfactory for arms of smaller diameter and for the lighter, easier to handle couplings which are used with these smaller arms. However, for larger diameter arms requiring correspondingly larger couplings, for couplings which carry the extra weight of attachments, or for couplings where there are inherently high turning torques, manual positioning of the coupling poses a problem. The control apparatus of the present invention avoids this problem, although it will be understood that the invention is not limited to automatically positioning a coupling flange in a vertical plane for convenient attachment to a manifold flange but has general utility for controllably positioning other pivoted fluid couplings.

The fluid transferring arm which the coupling control apparatus is used with may employ counterweights for counterbalancing the moments about the pivot axis of the inner boom and the moments about the pivot axis between the inner and outer booms. Another feature of the present invention is the mounting of the counterweight which balances the moments about the pivot axis between the booms in such a manner that it does not interfere with the coupling control apparatus nor with other parts of the arm.

Accordingly, it is an object of the present invention to provide improvements in a fluid transferring arm.

It is an object of the present invention to provide a coupling control apparatus for a fluid transferring arm.

Another object is to provide an apparatus which controls the attitude of a coupling that is pivoted on the outer boom of an articulated fluid transferring arm.

Another object is to facilitate the connection of a movable coupling on an articulated fluid transferring arm to a coupling that is in a predetermined relatively fixed attitude with respect to the movable coupling.

Another object is to maintain a flange on a coupling, that is pivoted on the outer boom of an articulated fluid transferring arm, in a predetermined attitude irrespective of the elevational position of the arm or the angular relationship of its booms.

Another object is to provide a coupling control apparatus of the type described in which a coupling can be forced out of its predetermined attitude if required.

Another object is to provide a mounting for the counterweight which counterbalances the moments about the pivot axis between the inner and outer booms so that the counterweight does not interfere with the coupling control apparatus nor with other parts of the arm during movement thereof.

These, together with the other objects, will become apparent upon reference to the following description and accompanying drawings in which;

FIGURE 1 is a side elevation of a fluid transferring arm including the coupling control apparatus of the present invention and showing the arm in a retracted position in full lines and in one of its projected positions in phantom lines.

FIGURE 2 is a rear elevation of the apparatus shown in FIGURE 1.

FIGURE 3 is a perspective of the subject apparatus.

FIGURES 4, 5 and 6 are diagrammatic views showing how the subject apparatus controls the attitude of the coupling on the fluid transferring arm irrespective of the position of the arm.

Referring more particularly to the drawings, a pier, platform, or other supporting surface is identified by the numeral 15. A fluid transferring arm 16 is mounted on the pier by a main support bracket 17 that is secured to the pier. The arm includes a tubular riser 19 having a horizontal portion 20 connected to a tank, not shown, containing or for receiving fluid, an elbow portion 21, and an upright portion 22. The riser also includes a swivel pipe joint 24, enabling rotation about a vertical axis 25, and an elbow 26 connected to this swivel joint and providing a horizontal portion 27. An inner swivel pipe joint 30 is connected to this horizontal portion 27 and provides for rotation about a horizontal inner axis 32.

An auxiliary support bracket 36 includes a sleeve 37 journalled on the upright portion 22 of the riser 19, a flange 38 projecting outward from this sleeve, an upright section 39 extending upward from the flange, and an upper section 40 projecting inward from the upright section and secured to the riser elbow 26. A spacer 42 is positioned between the flange 38 and the main support bracket 17. It is believed apparent that the elbow 26 and the auxiliary support bracket 36 are rotatable, relative to the upright portion 22 of the riser 19, about the vertical axis 25.

The fluid transferring arm 16 also includes a rigid tubular inner boom 46 having an inner elbow 47 provided with a substantially horizontal portion connected to the inner swivel joint 30 so that the inner boom is mounted for elevational movement about the inner axis 32 and is in fluid communication with the riser 19. The inner boom also has an outer elbow 48 provided with a horizontal portion. An intermediate swivel pipe joint 50 is connected to this latter horizontal portion for enabling rotation about an intermediate axis 51 coaxial with the outer horizontal portion of the inner boom.

In addition, the arm 16 includes a rigid tubular outer boom 56 having an inner elbow 58 provided with a horizontal portion connected to the intermediate joint 50 so that the outer boom is pivoted for elevational movement on the inner boom 46 and is in fluid communication therewith. The outer boom has an outer elbow 59 also provided with a horizontal portion to which is attached an outer swivel pipe joint 60 for enabling rotation about an outer axis 62 coaxial with the outer horizontal portion of the elbow 58. With particular reference to FIG. 2, it will be noted that the horizontal portions of the inner boom project toward the outer boom and that the horizontal portions of the outer boom project toward the inner boom. Because of their described mounting and interconnection, the booms are in spaced parallel relation to each other.

A tubular coupling 65 includes an upper elbow 66 connected in fluid conducting relation to the outer swivel pipe joint 60 and having a downturned portion. A swivel pipe joint 68 is connected to the downturned portion of the elbow 66, and an outboard elbow 70 interconnects this joint with an outboard swivel joint 71. A nipple 72 is connected to the latter joint and has a flange 73 thereon. The coupling is thus pivotal about the outer axis 62, defined by the outer swivel joint 60; a vertical axis 76, defined by the swivel joint 68; and a horizontal axis 77, defined by the swivel joint 71.

The coupling control apparatus of the present invention includes an inner coupling control sheave 85 surrounding the horizontal portion 27 of the riser elbow 26 in coaxial relation with the inner axis 32. This inner sheave is fixed to the horizontal portion 27. An intermediate coupling control sheave 88 is rotatably mounted on the horizontal portion of the inner elbow 58, coaxial with the intermediate axis 51, and coplanar with the inner sheave 85. Still further, an outer coupling control sheave 90 is rigidly secured to the horizontal portion of the outer elbow 59 coaxially of the outer axis 62. The outer sheave is in the same vertical plane as the inner and intermediate sheaves. All of the sheaves 85, 88 and 90 are of a uniform size.

A coupling control cable 95 has an inner end 96 trained over and connected at 97 to the inner control sheave 85, an intermediate portion 98 trained over the intermediate sheave 88 and an outer end 99 trained over and connected at 100 to the outer sheave 90. Preferably, the coupling control cable includes both a substantially non-extensible portion 101, such as a wire rope, and a tension spring portion 102 which is located relatively adjacent to the outer sheave.

The cable 95 is connected to the sheaves 85 and 90 so as to hold the flange 73 of the coupling 65 in a substantially vertical attitude, as illustrated in FIG. 1. Other attitudes could be selected as is believed understood. The spring portion 102 is of sufficient strength to maintain the flange in the attitude in which it is to be maintained by the cable. The purpose of the spring portion is to allow the flange to be manually forced out of its predetermined attitude upon the application of sufficient force, if some deviation from this predetermined attitude is desired.

For counterbalancing purposes, an inner boom control pulley 110 is rotatably mounted on the horizontal portion 27 of the elbow 26 coaxial with the inner axis 32 and in adjacent side-by-side relation with the inner sheave 85. An outer, boom control pulley 112 is secured to the inner elbow 58 of the outer boom 56 in adjacent side-by-side relation with the intermediate sheave 88 and in coaxial relation with the intermediate axis 51. The inner and outer pulleys are in a common vertical plane, as best seen in FIG. 2, and are of uniform size although larger in diameter than the sheaves. An arm control cable 114 is trained over the pulleys and is connected thereto so that these pulleys rotate in unison about their respective axes. Of course, since the outer pulley is rigid with the outer boom 56, rotation of the inner pulley results in movement of the outer boom, and vice versa. The arm control cable includes a turnbuckle 116.

An inboard link 120 (FIG. 2) has an end 121 rigidly connected, as by welding, to the inner pulley 110 and radially projects outward from this pulley. An outboard link 122 has an inner end pivoted to the upright section 39 of the auxiliary support bracket 36 by a pin 124 which is coaxial with the inner axis 32. A shaft 126 is supported by the projecting ends of the links, and an outer boom counterweight 128 is supported on this shaft between the links. This counterweight exerts a turning moment about the intermediate axis 51, through the arm control cable 114, which counteracts the turning moment imposed by the outer boom 56 and coupling 65 about the intermediate axis 51. The effect of the counterweight 128 is that the outer boom remains in whatever position it is placed.

A beam 132 has a forward portion 133 extending lengthwise of and rigidly secured, as by welding, to the inner boom 46 and a rearward portion 134 projecting on the opposite side of the inner axis 32 from the forward portion. A main counterweight 136 is supported on the rearward portion of the beam and imposes a turning moment about the inner axis which counteracts the turning moment of the inner boom, the outer boom 56, the coupling 65, the intermediate sheave 88, the outer pulley 112, and the outer sheave 90 about the inner axis 32. Thus, the inner boom remains in whatever position it is placed as a result of the main counterweight.

In operation of the control apparatus of the present invention, let it be assumed that it is desired to connect the fluid transferring arm 16 to the vertical, longitudinally disposed flange 150 of the manifold 152 of a ship, as schematically indicated at 154 in FIGURES 4, 5 and 6. With reference to FIGURE 4, the main and outer boom counterweights 136 and 128 are moved in order to adjust the inner and outer booms 46 and 56 about their respective axes 32 and 51 and to bring the coupling flange 73 into face to face relation with the manifold's flange 150. Because of the subject control apparatus, the coupling flange remains in a vertical attitude irrespective of the elevational adjustments of the booms. Thereafter, by further adjustments of the counterweights, the coupling flange is brought into engagement with the manifold flange, and the two flanges are interconnected, it being again noted that the spring portion 102 accommodates slight non-parallelism of the flanges.

FIGURES 5 and 6 illustrate that the flanges 150 and 73 can be readily connected even though the ship 154 is considerably below (FIG. 5) or above (FIG. 6) the pier 15. Futhermore, the fluid transferring arm 16 may be adjusted about the vertical axis 25 and the coupling 65 may be adjusted about the vertical axis 76 in order to effect interconnection of the flanges. At all times, however, the flange 73 remains vertical. However, if the manifold flange 150 were not vertical, but where in some other predetermined attitude, the flange 73 could be initially positioned in such other attitude so as to be in confronting parallel relation which the flange 150 upon elevational adjustment of the booms 46 and 56.

After the flanges 73 and 150 are connected, the fluid transferring arm 16 accommodates movement of the ship 154 with respect to the pier 15, it being noted that the coupling flange moves with the manifold flange. Referring to FIGS. 4, 5 and 6, even lateral rocking of the ship is accommodated since the spring portion 102 permits counterclockwise movement of the coupling about axis 62, and there is no impediment to clockwise movement thereof.

From the foregoing, it will be evident that the subject coupling control apparatus avoids the manhandling of the coupling in order to bring it into the desired attitude for effecting connection with the manifold. Although the invention has been specifically described in connection with the interconnection of vertical flanges, it will be evident that the principles of the invention are applicable to maintain various types of movable couplings, of a articulated fluid transferring arm, in a predetermined attitude with respect to a relatively fixed coupling to which it is desired to attach the movable coupling.

Although a preferred embodiment of the present invention has been shown and described, it will be understood that various changes and modifications may be made in the details thereof without departing from the spirit and the scope of the appended claims.

Having described the invention, what is claimed as new and desired to be secured by Letters Patent is as follows:

1. In a fluid transferring arm, a tubular fluid conducting riser having a lower upright portion and a substantially horizontal portion, an inner sheave encircling and stationary with respect to said horizontal portion of the riser, a rigid tubular inner boom having an inner horizontal portion swively connected in fluid-tight relation to the horizontal portion of the riser and an outer horizontal portion, a rigid tubular outer boom having an inner horizontal portion swively connected in fluid-tight relation to the outer horizontal portion of the inner boom thereby providing an intermediate axis of rotation, the outer boom also having an outer horizontal portion, an intermediate sheave encircling said intermediate axis and mounted on one of said booms, a coupling having an inner horizontal portion swively connected in fluid-tight relation to the outer horizontal portion of the outer boom thereby defining an outer axis of rotation, said coupling having a tubular connecting portion which is in acute angular relation with the horizontal, irrespective of the positions of the booms, when the coupling is unsupported and is allowed to pivot freely about said outer axis, an outer sheave encircling and stationary with respect to said inner portion of the coupling, and a cable trained over said intermediate sheave and having inner and outer ends respectively trained over and connected to the inner and outer sheaves so that the connecting portion of the coupling is held in a generally horizontal attitude irrespective of the positions of the booms.

2. The arm of claim 1 wherein said cable is resiliently extendable to enable said connecting portion of the coupling to be resiliently forced out of said generally horizontal attitude.

3. In a fluid transferring arm, a tubular fluid conducting riser having a lower upright portion and a substantially horizontal portion, a rigid tubular inner boom having an inner horizontal portion swively connected in fluid-tight relation to the horizontal portion of the riser thereby defining an inner axis, said inner boom also having an outer horizontal portion, an inner pulley encircling and rotatable on the horizontal portion of the riser, an inner sheave encircling and stationary with respect to said horizontal portion of the riser, a rigid tubular outer boom having an inner horizontal portion swively connected in fluid-tight relation to the outer horizontal portion of the inner boom thereby defining an intermediate axis of rotation, said outer boom also having an outer horizontal portion, an intermediate sheave encircling said intermediate axis and mounted on one of the booms, an outer pulley encircling said intermediate axis and stationary with respect to the outer boom, a boom control cable trained over and interconnecting the pulleys so that said outer boom moves in response to movement of the inner pulley and vice versa, a coupling having an inner horizontal portion swively connected in fluid-tight relation to the outer horizontal portion of the outer boom thereby defining an outer axis of rotation, said coupling having a planar flange which is in acute angular relation with the horizontal, irrespective of the positions of the booms, when the coupling is unsupported and is allowed to pivot freely about said outer axis, an outer sheave encircling and stationary with respect to the inner portion of the coupling, and a coupling control cable trained over the intermediate sheave and having inner and outer ends respectively trained over and connected to the inner and outer sheaves so that the flange of the coupling is held in a vertical plane irrespective of the positions of the booms.

4. The arm of claim 3 wherein said inner pulley and sheave are in side-by-side relation, wherein the outer pulley and intermediate sheave are in side-by-side relation, wherein the pulleys are in a common plane, wherein the sheaves are in a common plane, and wherein both of said planes are between said inner and outer booms.

5. The arm of claim 3 wherein said coupling control cable includes a tension spring adjacent to the coupling and a non-extensible rope.

6. In a fluid transferring arm, a riser; a substantially horizontal inner pipe portion connected to the riser and projecting outward therefrom; a boom including an inboard pipe swively connected in fluid tight relation to said inner pipe portion for elevational movement about a substantially horizontal axis in a plane substantially parallel to the plane of said riser and an extension on the opposite side of said axis from said pipe; a substantially horizontal intermediate pipe portion projecting from said pipe toward the plane of the riser; an outboard pipe swively connected in fluid tight relation to said intermediate pipe portion for elevational movement about a substantially horizontal intermediate axis and with the plane of the outer pipe being in spaced substantially parallel relation to the plane of the inner pipe; a substantially horizontal outer pipe portion projecting from the outboard pipe toward the plane of the inboard pipe; a coupling including a first elbow having a horizontal portion swively connected to the outer pipe portion for pivotal movement about an outer axis substantially parallel to said inner axis and a downturned portion, a second elbow having an upturned portion connected to said downturned portion, and an out-turned portion, and a flange connected to said out-turned portion, said flange being in an acute angular relation to a horizontal when said coupling is allowed to pivot freely under the influence of gravity about said outer axis; an outer pulley fixed to said outboard pipe relatively adjacent to said intermediate axis; an inner pulley rotatably mounted alongside of said boom relatively adjacent to said inner axis, said inner and outer pulleys being in a common vertical plane lying between the planes of said inboard and outboard pipes; a cable interconnecting said pulleys; first means on said extension to counterbalance the moments about said inner axis; and second means on said inner pulley for counterbalancing the moments about said intermediate axis, an apparatus for positioning said flange comprising an outer sheave fixed to said horizontal portion of said first elbow, an intermediate sheave mounted on said intermediate pipe portion in side-by-side relation with said outer pulley, an inner sheave fixed against rotation and positioned alongside of said boom relatively adjacent to said inner axis, all of said sheaves being located in a common vertical plane which is in spaced parallel relation to and between the planes of the pulleys and the inboard pipe, and a cable fixed to the inner and outer sheaves and trained over the intermediate sheave and maintaining said flange in a vertical position irrespective of the attitudes of said inboard and outboard pipes.

7. The arm of claim 6 wherein the cables are both located in vertical planes which planes are laterally displaced from said second counterbalancing means to avoid interference between said second means and said cables.

References Cited
UNITED STATES PATENTS

| | | | |
|---|---|---|---|
| 1,786,608 | 12/1930 | Halstead | 214—147 X |
| 3,073,343 | 1/1963 | Mowell et al. | 141—387 X |
| 3,085,593 | 4/1963 | Sorensen | 141—387 X |

FOREIGN PATENTS

| | | |
|---|---|---|
| 360,218 | 11/1931 | Great Britain. |

LAVERNE D. GEIGER, *Primary Examiner.*

E. J. EARLS, *Assistant Examiner.*